United States Patent
Sermpongs (10) Patent No.: US 10,307,981 B2
(45) Date of Patent: Jun. 4, 2019

(54) METHODS FOR MAKING A FOOTWEAR ARTICLE

(71) Applicant: VF Asia Limited, Hong Kong (CN)

(72) Inventor: Pairush Sermpongs, Ayutthaya Province (TH)

(73) Assignee: VF Asia Limited, Hong Kong (CN)

( * ) Notice: Subject to any disclaimer, the term of this patent is extended or adjusted under 35 U.S.C. 154(b) by 23 days.

(21) Appl. No.: 15/433,808

(22) Filed: Feb. 15, 2017

(65) Prior Publication Data

US 2018/0229461 A1    Aug. 16, 2018

(51) Int. Cl.
*B29D 35/12* (2010.01)
*A43B 13/04* (2006.01)
(Continued)

(52) U.S. Cl.
CPC .............. *B29D 35/122* (2013.01); *A43B 9/04* (2013.01); *A43B 9/12* (2013.01); *A43B 13/04* (2013.01); *A43B 13/32* (2013.01); *A43B 13/42* (2013.01); *A43D 3/026* (2013.01); *B29D 35/065* (2013.01); *B29D 35/085* (2013.01); *B29D 35/142* (2013.01); *B29K 2021/00* (2013.01); *B29K 2105/24* (2013.01)

(58) Field of Classification Search
CPC .. B29D 35/122; B29D 35/142; B29D 35/085; B29D 35/0054; B29D 35/06
USPC ...................................... 12/146 BR
See application file for complete search history.

(56) References Cited

U.S. PATENT DOCUMENTS

| 3,303,250 A | * | 2/1967 | Bingham, Jr. | ......... A43B 13/12 264/145 |
| 4,755,320 A | | 7/1988 | Cohen et al. | |

(Continued)

FOREIGN PATENT DOCUMENTS

| CN | 1509297 A | 6/2004 |
| CN | 1946786 A | 4/2007 |

(Continued)

OTHER PUBLICATIONS

DTechnicalNote—Vulcanization, Nocil Limited, http://www.nocil.com/Downloadfile/DTechnicalNote-Vulcanization-Dec10, date accessed Nov. 11, 2016; pp. 1-35.

*Primary Examiner* — Marie D Bays
(74) *Attorney, Agent, or Firm* — Smith, Gambrell & Russell LLP (57) ABSTRACT

A footwear article is formed according to a process that includes the steps of: forming a sheet including a rubber outsole material; forming an outsole component by passing the sheet through an extruder or calendar machine; applying a vulcanizing accelerant to the outsole component by dipping the outsole component in a liquid bath; forming a plurality of rubber outsoles from the outsole component by cutting the outsole component into the plurality of rubber outsoles; incorporating each of the plurality of rubber outsoles into the footwear article; and vulcanizing the footwear article. The vulcanizing accelerant includes a dithiocarbamate compound. The footwear article includes the rubber outsole, an insole and an upper. The vulcanizing accelerant allows the step of vulcanizing the footwear article to be performed substantially faster as compared to conventional footwear vulcanization methods.

12 Claims, 8 Drawing Sheets

(51) Int. Cl.
*A43B 13/32* (2006.01)
*A43D 3/02* (2006.01)
*B29D 35/14* (2010.01)
*B29D 35/08* (2010.01)
*A43B 9/04* (2006.01)
*A43B 9/12* (2006.01)
*A43B 13/42* (2006.01)
*B29D 35/06* (2010.01)
*B29K 21/00* (2006.01)
*B29K 105/24* (2006.01)

(56) References Cited

U.S. PATENT DOCUMENTS

| | | | |
|---|---|---|---|
| 8,261,392 B2 * | 9/2012 | Yabushita | A43B 13/26 |
| | | | 12/146 BP |
| 2004/0000740 A1 * | 1/2004 | Chi | A43B 13/38 |
| | | | 264/157 |
| 2007/0271713 A1 * | 11/2007 | Koo | A43B 13/12 |
| | | | 12/146 B |
| 2010/0112259 A1 | 5/2010 | Cruse et al. | |

FOREIGN PATENT DOCUMENTS

| | | |
|---|---|---|
| CN | 101616980 A | 12/2009 |
| CN | 102079824 A | 6/2011 |
| WO | 02/74820 | 9/2002 |

\* cited by examiner

METHODS FOR MAKING A FOOTWEAR ARTICLE

FIELD OF THE DISCLOSURE

The present disclosure relates to methods for making footwear articles and to footwear articles formed therefrom, and in particular to methods for making footwear articles having reduced vulcanization time.

BACKGROUND OF THE DISCLOSURE

Conventional methods of making footwear include forming a rubber outsole material (which can include a natural or synthetic rubber material), compounding the rubber outsole material into a sheet, cooling the sheet, extruding or calendaring the sheet into an outsole component, and then cutting the outsole component into forms for rubber outsoles. In many cases these rubber outsoles are still in raw rubber form and need to be chemically altered (vulcanized) to cure and strengthen the rubber material. This is typically done after assembly of the rubber outsole into a footwear article. Conventional vulcanization processes may be performed on footwear articles for at least 70-80 minutes at a temperature of about 120 degrees Celsius.

Despite improvements in footwear materials and design, the methods for making footwear articles described above, including the need to vulcanize the footwear article for at least 70-80 minutes, have not changed substantially for at least the last 60 years or so.

These and other shortcomings are addressed by aspects of the present disclosure.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

SUMMARY

Aspects of the disclosure relate to a method for making a footwear article, including:

forming a mixture of rubber outsole material including one or more natural or synthetic rubber materials, a filler material, a wax material, and an activator;

compounding the mixture of rubber outsole material into a sheet; cooling the sheet; forming an outsole component by passing the sheet through an extruder or calendar machine;

cooling the outsole component;

applying a vulcanizing accelerant to the outsole component by dipping the outsole component in a liquid bath including about 15% to about 25% by weight of the vulcanizing accelerant for at least 5 seconds, the vulcanizing accelerant including a dithiocarbamate compound;

forming a plurality of rubber outsoles from the outsole component by cutting the outsole component into the plurality of rubber outsoles;

incorporating each of the plurality of rubber outsoles into the footwear article, the footwear article including the rubber outsole, an insole and an upper; and vulcanizing the footwear article at a temperature of approximately 120 degrees Celsius for a time of approximately 40 minutes.

Aspects of the disclosure further relate to a footwear article formed according to a process including the steps of:

forming a sheet comprising a rubber outsole material;

forming an outsole component by passing the sheet through an extruder or calendar machine;

applying a vulcanizing accelerant to the outsole component by dipping the outsole component in a liquid bath, the vulcanizing accelerant including a dithiocarbamate compound;

forming a plurality of rubber outsoles from the outsole component by cutting the outsole component into the plurality of rubber outsoles;

incorporating each of the plurality of rubber outsoles into the footwear article, the footwear article including the rubber outsole, an insole and an upper; and vulcanizing the footwear article.

The step of vulcanizing the footwear article is performed for an amount of time that is from about 30% to about 60% less than an amount of time required to vulcanize a substantially identical footwear article prepared by a substantially identical process but that does not include the step of applying the vulcanizing accelerant to the outsole component.

Further aspects of the disclosure relate to a method for making a footwear article, including:

forming a sheet comprising a rubber outsole material;

forming an outsole component by passing the sheet through an extruder or calendar machine;

applying a vulcanizing accelerant to the outsole component by dipping the outsole component in a liquid bath, the vulcanizing accelerant including a dithiocarbamate compound;

forming a plurality of rubber outsoles from the outsole component by cutting the outsole component into the plurality of rubber outsoles;

incorporating each of the plurality of rubber outsoles into the footwear article, the footwear article including the rubber outsole, an insole and an upper; and vulcanizing the footwear article.

The step of vulcanizing the footwear article is performed for an amount of time that is from about 30% to about 60% less than an amount of time required to vulcanize a substantially identical footwear article prepared by a substantially identical method but that does not include the step of applying the vulcanizing accelerant to the outsole component.

DETAILED DESCRIPTION

The present disclosure can be understood more readily by reference to the following detailed description of the disclosure and the Examples included therein. In various aspects, the present disclosure pertains to methods for making a footwear article, including:

forming a sheet including a rubber outsole material;

forming an outsole component by passing the sheet through an extruder or calendar machine;

applying a vulcanizing accelerant to the outsole component by dipping the outsole component in a liquid bath;

forming a plurality of rubber outsoles from the outsole component by cutting the outsole component into the plurality of rubber outsoles;

incorporating each of the plurality of rubber outsoles into the footwear article; and vulcanizing the footwear article.

The vulcanizing accelerant includes a dithiocarbamate compound, and the footwear article includes the rubber outsole, an insole and an upper. The step of vulcanizing the footwear article is performed for an amount of time that is from about 30% to about 60% less than an amount of time required to vulcanize a substantially identical footwear article prepared by a substantially identical method but that does not include the step of applying the vulcanizing accelerant to the outsole component.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a vulcanizing accelerant" includes mixtures of two or more vulcanizing accelerants.

As used herein, the term "combination" is inclusive of blends, mixtures, alloys, reaction products, and the like.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additional additives" means that the additional additives can or cannot be included and that the description includes aspects in which the additional additives are both included and omitted.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Methods for Making a Footwear Article

Figure 1:
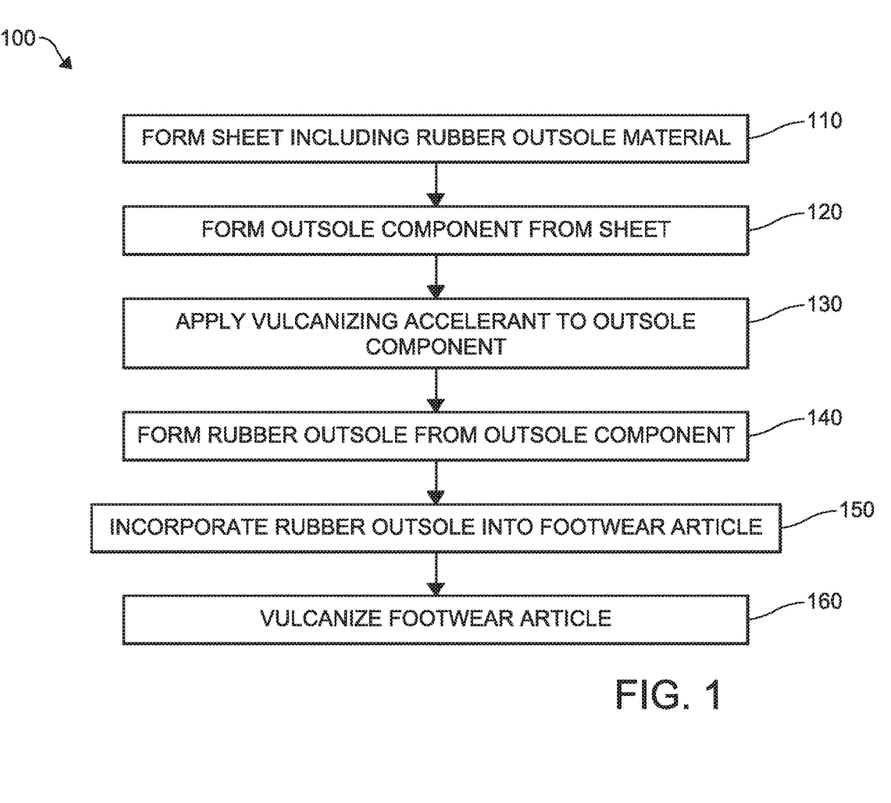
FIG. 1 is a block diagram illustrating a method for forming a footwear article according to an aspect of the disclosure.

With reference to FIG. 1, aspects of the disclosure relate to a method 100 for making a footwear article, including:

forming a sheet including a rubber outsole material, at step 110; forming an outsole component by passing the sheet through an extruder or calendar machine, at step 120;

applying a vulcanizing accelerant to the outsole component by dipping the outsole component in a liquid bath, at step 130;

forming a plurality of rubber outsoles from the outsole component by cutting the outsole component into the plurality of rubber outsoles, at step 140;

incorporating each of the plurality of rubber outsoles into the footwear article, at step 150; and vulcanizing the footwear article, at step 160.

The vulcanizing accelerant includes a dithiocarbamate compound, and the footwear article includes the rubber outsole, an insole and an upper. The step of vulcanizing the footwear article, at step 160, is performed for an amount of time that is from about 30% to about 60% less than an amount of time required to vulcanize a substantially identical footwear article prepared by a substantially identical method but that does not include the step of applying the vulcanizing accelerant to the outsole component.

Aspects of the method 100 include, at 110, forming a sheet including a rubber outsole material. In some aspects, forming the sheet including the rubber outsole material includes forming a mixture of the rubber outsole material, compounding the mixture of the rubber outsole material into the sheet, and cooling the sheet.

The mixture of the rubber outsole material may include one or more natural or synthetic rubber materials. Any of the several varieties of natural rubber may be used in the mixture. Exemplary synthetic rubbers suitable for use in the mixture include, but are not limited to, butadiene rubber, styrene-butadiene rubber, polyisoprene rubber (IR), nitride butadiene rubber (NBR), polychloroprene rubber (CR), neoprene, polysulfide rubbers (thiokols), polybutyl rubber and Halogenated butyl rubber (IIR, CIIR, BIIR), silicones and combinations thereof.

The mixture of the rubber outsole material may also include one or more filler materials. Filler materials strengthen the rubber network of the outsole material, filling "gaps" between the rubber polymers. They can enhance processability of the natural or synthetic rubber materials in the mixture of rubber outsole material and/or modify selected properties of the rubber outsole material, including but not limited to tensile strength, wear resistance and tear resistance. Exemplary filler materials suitable for use in aspects of the disclosure include, but are not limited to, carbon black, silica, alumina, zirconium, titanium dioxide, clay, calcium carbonate, magnesium carbonate, talc, zinc stearate, mica, molybdenum disulphide and combinations thereof.

The mixture of the rubber outsole material may also include a wax material. The wax material may be included as antizonants (substances that delay the onset or growth of cracks resulting from ozone attack), and improve the degradation properties of the rubber outsole material. Exemplary wax materials suitable for use in aspects of the disclosure include, but are not limited to, organic wax (e.g., paraffin wax), polyethylene wax, and combinations thereof.

The mixture of the rubber outsole material may also include an activator. An activator supports the rubber vulcanization process. Exemplary activators suitable for use in aspects of the disclosure include zinc oxide, calcium oxide, magnesium oxide, stearic acid and combinations thereof. In a particular aspect, the activator is zinc oxide.

The mixture of the rubber outsole material may be combined in a suitable apparatus, such as a Banbury® mixer, and mixed until a desired amount of mixing is achieved.

Figure 2:
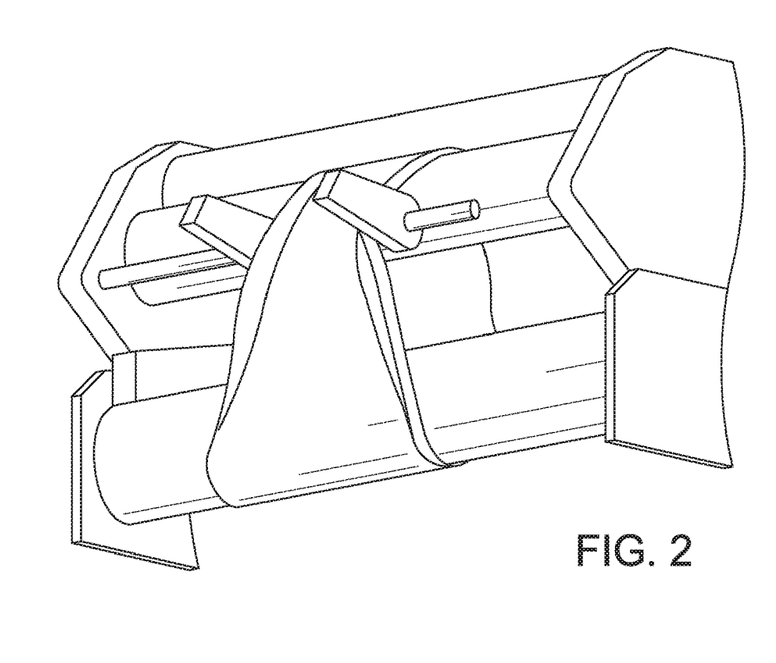
FIG. 2 is a photograph illustrating compounding of a mixture of rubber outsole material into a sheet according to an aspect of the disclosure.

Following forming the mixture of the rubber outsole material, the mixture of the rubber outsole material may be compounded into a sheet. Compounding involves shearing and shortening the long polymer chains of the rubber molecules and can involve the addition of heat, mechanical stress and/or oxygen to the mixture of the rubber outsole material. In an aspect, the compounding of the mixture of the rubber outsole material into a sheet is performed in a two-roll mill, as shown in FIG. 2. During the compounding process additional optional additives, including but not limited to colorants and sulfur, may be added to the mixture of the rubber outsole material.

Figure 3:
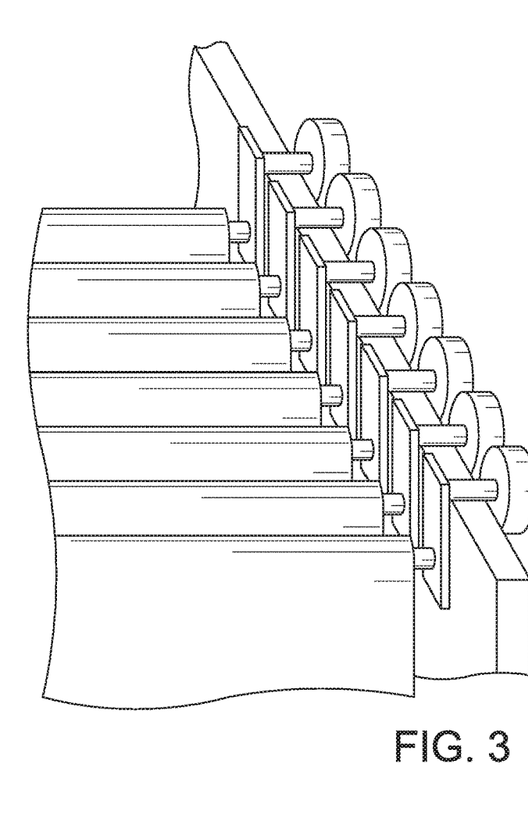
FIG. 3 is a photograph illustrating a sheet including a mixture of rubber outsole material hanging for cooling according to an aspect of the disclosure.

As noted, during the compounding process heat may be added as the mixture of rubber outsole material is compounded into the sheet. In some aspects it will be desirable to remove this heat prior to further processing of the sheet. In such aspects step 110 thus further includes cooling the sheet. In an aspect, as shown in FIG. 3, the sheet is hung on a cooling rack.

Figure 4:
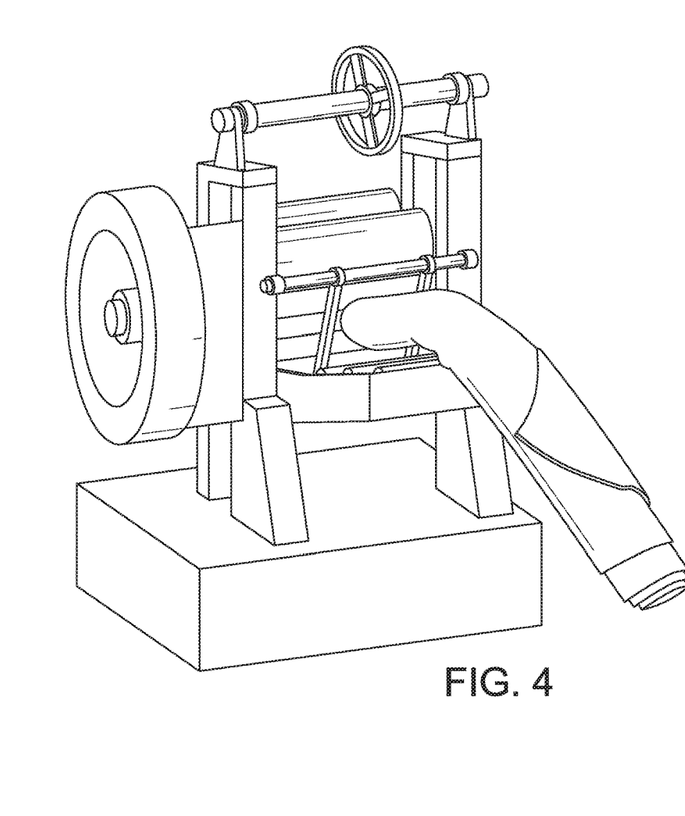
FIG. 4 is a photograph illustrating a sheet including a mixture of rubber outsold material being fed into a calendar machine according to an aspect of the disclosure.
Figure 5:
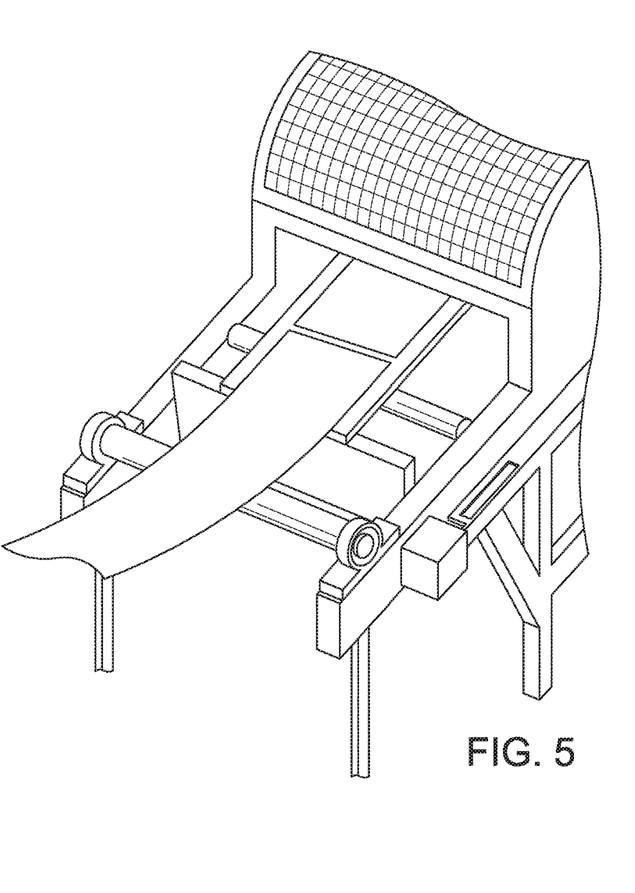
FIG. 5 is a photograph illustrating a cut outsole component according to an aspect of the disclosure.

Aspects of the method further include, at step 120, forming an outsole component by passing the sheet through an extruder or calendar machine. If an extruder is used, the cooled sheet is passed through the extruder, where pressure and heat are applied to the sheet. Flutes of the revolving extruder screw carry the mixture of rubber outsole material towards the extruder die. The die will be configured to extrude the sheet/mixture of rubber outsole material into a form suitable for the outsole component. Similarly, if a rubber calendar machine is used pressure and heat is applied to the sheet/mixture of rubber outsole material to roll the sheet into a form desirable for the outsole component. The outsole component may be cut into manageable sizes as desired. An exemplary sheet being fed into a calendar machine (which is rolled to fit into the calendar machine) is illustrated in FIG. 4, and a cut outsole component is illustrated in FIG. 5. In certain aspects the form suitable for the outsole component is a sheet, such as that illustrated in FIG. 5, from which the plurality of rubber outsoles may be formed (as discussed below).

Aspects of the method 100 include, at step 130, applying a vulcanizing accelerant to the outsole component by dipping the outsole component in a liquid bath, at step 130. The vulcanizing accelerant includes a dithiocarbamate compound.

In some aspects the liquid bath includes about 5% to about 50% by weight of vulcanizing accelerant. In further aspects the liquid bath includes about 10% to about 40% by weight of the vulcanizing accelerant. In particular aspects the liquid bath includes about 15% to about 25% by weight of the vulcanizing accelerant. In some aspects the liquid bath includes other additives, including but not limited to a surfactant (e.g., soap) to facilitate pick up of the vulcanizing accelerant by the outsole component. The balance of liquid bath may be water or another suitable solvent.

The outsole component may be dipped in the liquid bath including the vulcanizing accelerant for an amount of time sufficient to allow the outsole component to pick up a desirable amount of vulcanizing accelerant from the liquid bath. In some aspects, the outsole component is dipped in the liquid bath for at least 5 seconds. In further aspects, the outsold blank is dipped in the liquid bath for at least 10 seconds, or in particular aspects for at least 15 seconds.

In some aspects the vulcanizing accelerant has an average particle size of less than about 1.5 micrometers. In further aspects substantially all of the vulcanizing accelerant has a particle size less than 20 micrometers. In yet further aspects the vulcanizing accelerant has a pH of from about 8.5 to about 12.5. In certain aspects the vulcanizing accelerant has a total solid content of from about 51.0 to about 52.0%. An exemplary dithiocarbamate compound suitable for use in aspects of the disclosure is available from Polymer Innovation Co. under the name Hydroperse.

Figure 6:
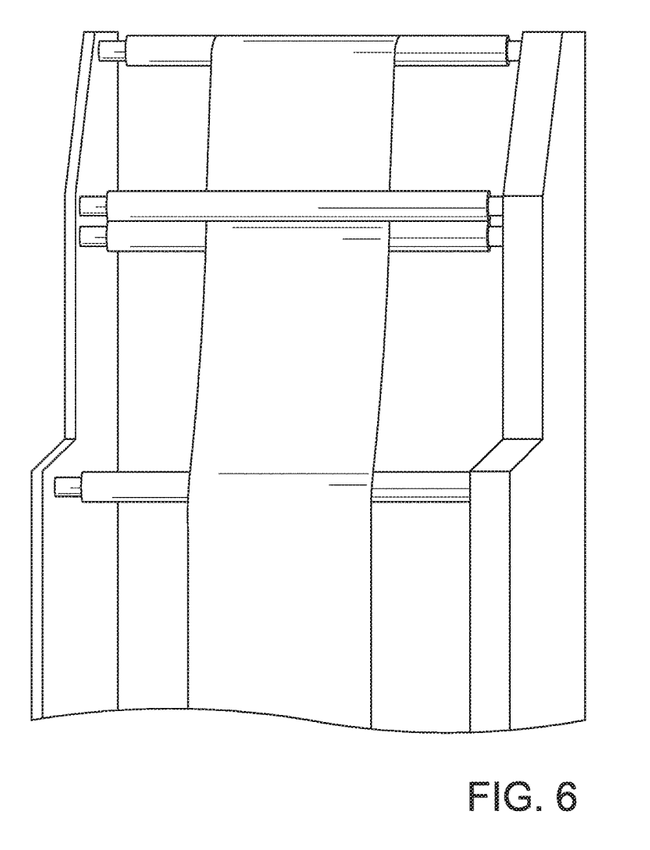
FIG. 6 is a photograph illustrating an outsole component being dipped into a liquid bath including a vulcanizing accelerant according to an aspect of the disclosure.

An exemplary step of applying a vulcanizing accelerant to the outsole component by dipping the outsole component in a liquid bath (step 130) is illustrated in FIG. 6.

A traditional method for making a footwear article may include a water cooling step following a step of forming an outsole component by passing a sheet including a mixture of rubber outsole material through an extruder or calendar machine. In the water cooling step, the outsole component is cooled by passing it through a cooling bath, which may include—but does not have to include—chemical additives such as anti-tack or other additives. In aspects of the method according to the present disclosure, the outsole component may also be, but does not have to be, passed through a cooling bath optionally including one or more chemical additives (e.g., an anti-tack additive). In some aspects of the disclosure, the step of dipping the outsole component in a liquid bath (step 130) is performed in the same cooling bath as described herein. In other words, the vulcanizing accelerant may be added to the same liquid bath as that used to cool the outsole component. In other aspects of the disclosure, the step of dipping the outsole component in a liquid bath (step 130) is performed in a different liquid bath. In other words, the outsole component may be passed through a cooling bath including one or more optional chemical additives (e.g., an anti-tack additive) either before or after the outsole component is dipped in a separate liquid bath including the vulcanizing accelerant (step 130).

Figure 7:
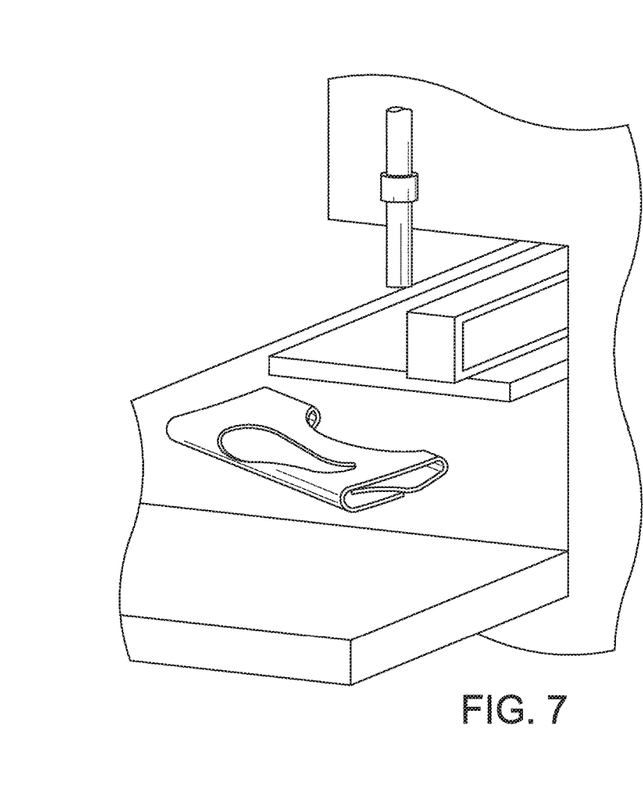
FIG. 7 is a photograph illustrating rubber outsoles being cut from an outsole component according to an aspect of the disclosure.
Figure 8:
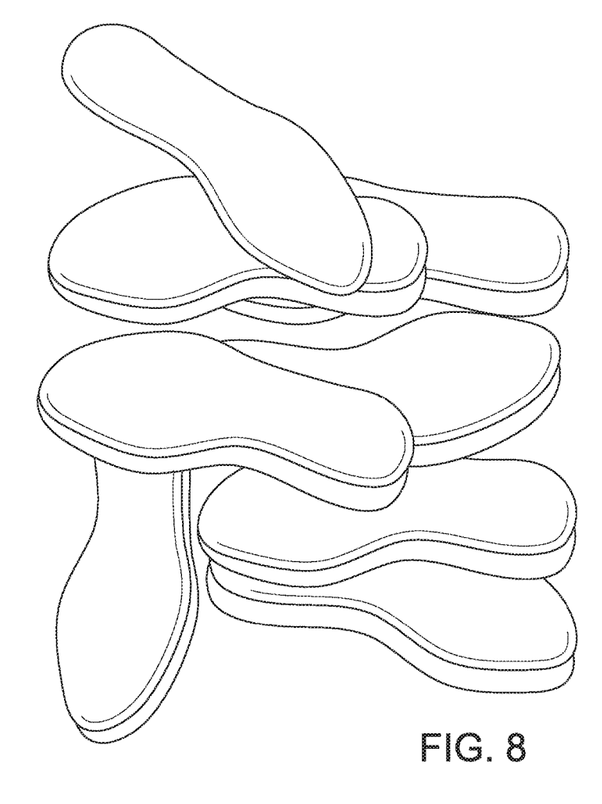
FIG. 8 is a photograph illustrating a plurality of rubber outsoles after being cut from an outsole component according to an aspect of the disclosure.

Aspects of the method 100 further include, at step 140, forming a plurality of rubber outsoles from the outsole component by cutting the outsole component into the plurality of rubber outsoles. In one aspect, the rubber outsoles are cut from the outsole component using a die cutting machine, as shown in FIG. 7. FIG. 8 illustrates a plurality of rubber outsoles after cutting.

At step 150 of the method 100 each of the plurality of rubber outsoles are incorporated into a footwear article. The footwear article includes at least the rubber outsole, an insole and an upper. Assembly of the footwear article is accomplished according to conventional methods. In an aspect, the footwear article is assembled with a "shoe last," which is a form around which the upper is fitted. An upper is the part or parts of a footwear article (e.g., shoe) that cover the toes, top of the foot, sides of the foot and back of the heel. In certain aspects the upper is a single-piece construction, while in other aspects it is comprised of two or more pieces stitched together. Uppers according to aspects of the disclosure can be made from a variety of materials, including but not limited to leather, satin, suede, canvas, mesh fabric, and even straps (for sandals/flip flops).

The insole is a board that supports the bottom of the foot. The insole is cemented or glued to the rubber outsole. Exemplary insole materials include but are not limited to cellulose paper board, leather, and synthetic materials.

Figure 9:
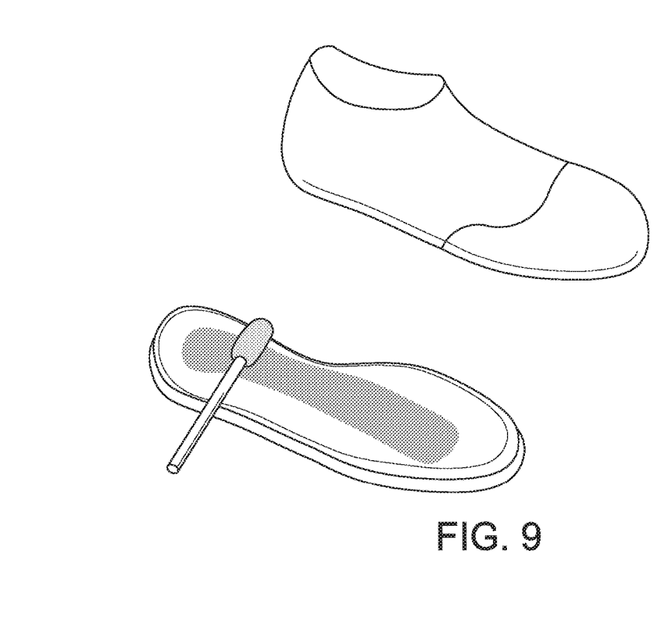
FIG. 9 is a photograph illustrating application of cement/adhesive to a rubber outsole according to an aspect of the disclosure.
Figure 10:
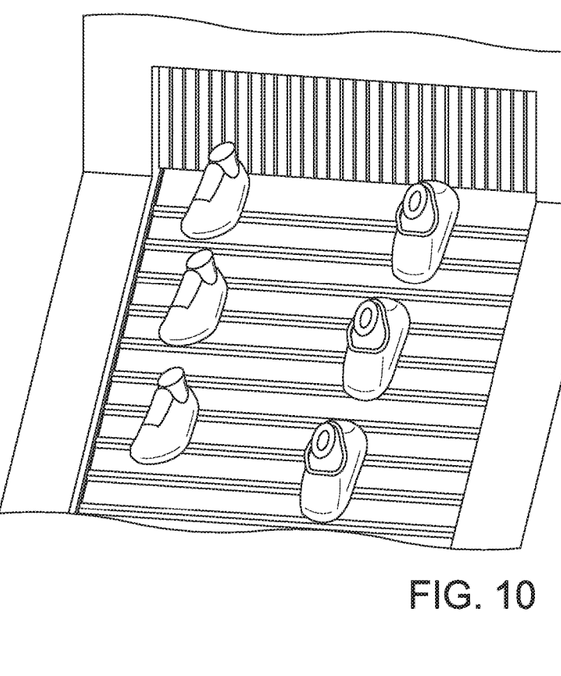
FIG. 10 is a photograph illustrating heating of a cemented rubber outsole and joined insole/upper according to an aspect of the disclosure.
Figure 11:
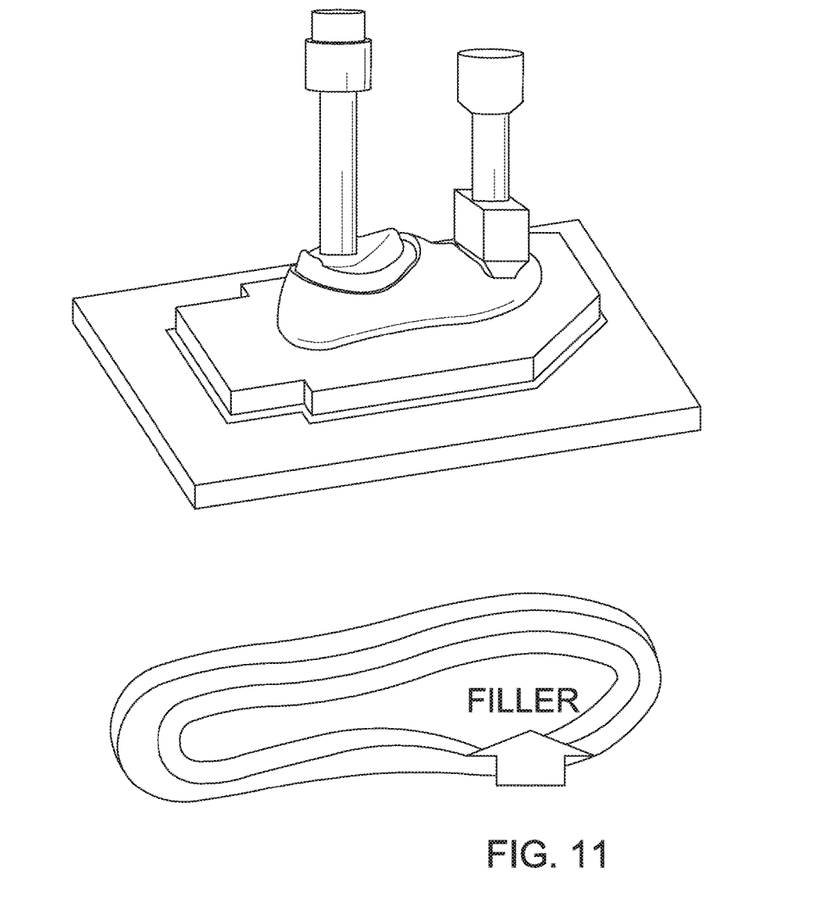
FIG. 11 is a photograph illustrating filler applied to the bottom of an insole and application of pressure thereto according to an aspect of the disclosure.
Figure 12:
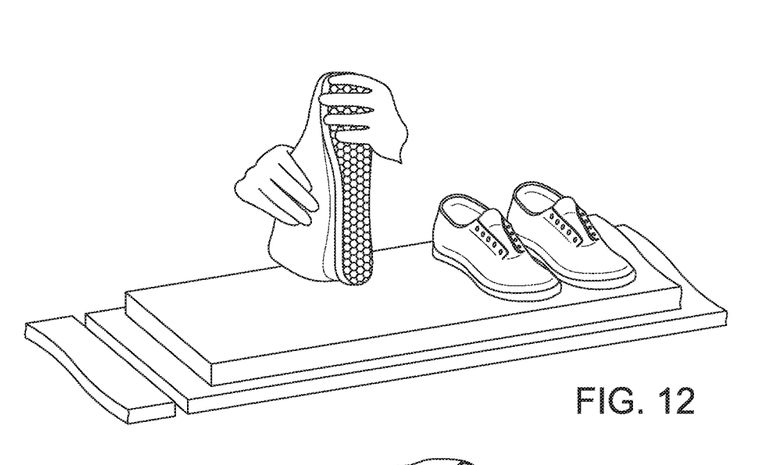
FIG. 12 is a photograph illustrating a rubber outsole being attached to an insole/upper according to an aspect of the disclosure.
Figure 13:
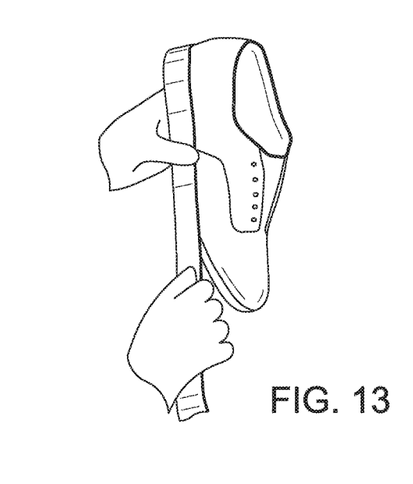
FIG. 13 is a photograph illustrating attachment of foxing tape to a rubber outsole and upper according to an aspect of the disclosure.

In an exemplary step for incorporating a rubber outsole into a footwear article (150), an adhesive such as but not limited to glue or rubber cement, is applied to the surface of the rubber outsole that will be adhered to the insole. An adhesive, such as latex, is applied to the edge of the insole board and the insole is secured to the upper. A toe lasting operation may be used to shape the upper around the insole, a side lasting operation may be used to align the sides of the upper to the insole, and a heel lasting operation may be used to adjust the heel height and flatten the heel bottom area of the footwear article. Following the optional lasting operations, cement/adhesive may be applied to the rubber outsole (see FIG. 9), and the cemented rubber outsole and joined insole/upper are heated to partially dry the cement and prepare the rubber outsole for joining (see FIG. 10). In one aspect, filler is added to the bottom of the insole (where the rubber outsole will be applied) to ensure a flat surface for the rubber outsole. Pressure is applied to the filler to flatten the surface. FIG. 11 illustrates filler applied to the bottom of the insole and pressure being applied thereto. In an aspect, pressure of about 10-15 kilograms is applied for about 2-5 seconds. Cement/adhesive is then applied to the filler, and the rubber outsole is attached to the filler to join the rubber outsole to the insole and upper and form the footwear article, as illustrated in FIG. 12. Pressure is applied to fix the rubber outsole to the insole/filler. In an aspect, pressure of about 10-15 kilograms is applied for about 2-5 seconds. In some aspects the rubber outsole is cemented to the upper and heated to fix the rubber outsole thereto. Optionally, foxing tape may be attached to the rubber outsole and upper with adhesive and secured with pressure (about 10-15 kilograms is applied for about 2-5 seconds), as illustrated in FIG. 13.

The method 100 further includes, at step 160, vulcanizing the footwear article. The vulcanizing step involves heating the footwear article at a temperature that modifies the natural or synthetic rubber materials in the rubber outsole by forming cross-links (bridges) between individual polymer chains in the natural or synthetic rubber materials, making them more durable. In an aspect, the assembled footwear articles are loaded onto a rack/trolley and then heated in an oven, such as but not limited to an autoclave oven.

In some aspects the step of vulcanizing the footwear article, at step 160, is performed for an amount of time that is from about 30% to about 60% less than an amount of time required to vulcanize a substantially identical footwear article prepared by a substantially identical method but that does not include the step of applying the vulcanizing accelerant to the outsole component. The vulcanizing accelerant including the dithiocarbamate compound, applied at step 130 as described herein, allows for substantially reduced vulcanization time as compared to previously known processes for making footwear that have not included a dithiocarbamate compound. In certain aspects the step of vulcanizing the footwear article, at step 160, is performed for an amount of time that is from about 50% to about 60% less than an amount of time required to vulcanize a substantially identical footwear article prepared by a substantially identical method but that does not include the step of applying the vulcanizing accelerant to the outsole component.

A substantially identical footwear article, as the term is used herein, is a footwear article that includes the same components, in the same relative amounts, as the footwear article according to the disclosure, except that it does not include the step of applying the vulcanizing accelerant to the outsole component. The substantially identical footwear article will thus not include a vulcanizing accelerant in the rubber outsole during the step of vulcanizing the footwear article at step 160.

In particular aspects the step of vulcanizing the footwear article, at step 160, is performed at a temperature of approximately 120 degrees Celsius for a time of approximately 40 minutes. This is in contrast to previous methods for making footwear articles that have not included a dithiocarbamate vulcanizing accelerant, which require a vulcanization time of at least about 70-80 minutes at this temperature.

Following vulcanization the footwear article is cooled and may then be subjected to one or more conventional finishing steps, including but not limited to de-lasting (removal of the shoe last), cleaning, quality control inspection, application of a fungicide, labeling and packaging.

Footwear Articles

Aspects of the disclosure further relate to footwear articles formed according to a process including the steps of:
forming a sheet comprising a rubber outsole material;
forming an outsole component by passing the sheet through an extruder or calendar machine;
applying a vulcanizing accelerant to the outsole component by dipping the outsole component in a liquid bath, the vulcanizing accelerant including a dithiocarbamate compound;
forming a plurality of rubber outsoles from the outsole component by cutting the outsole component into the plurality of rubber outsoles;
incorporating each of the plurality of rubber outsoles into the footwear article, the footwear article comprising the rubber outsole, an insole and an upper; and
vulcanizing the footwear article.

The step of vulcanizing the footwear article is performed for an amount of time that is from about 30% to about 60% less than an amount of time required to vulcanize a substantially identical footwear article prepared by a substantially identical process but that does not include the step of applying the vulcanizing accelerant to the outsole component.

Aspects of the process are as described above with respect to the description of the method 100 for making a footwear article and not reproduced herein. Footwear articles that may be made according to aspects of the present disclosure include, but are not limited to, casual shoes, loafers, sneakers, formal shoes, dress shoes, boots, sandals and flip flops.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1: A method for making a footwear article, comprising:
forming a mixture of rubber outsole material comprising one or more natural or synthetic rubber materials, a filler material, a wax material, and an activator;
compounding the mixture of rubber outsole material into a sheet;
cooling the sheet;
forming an outsole component by passing the sheet through an extruder or calendar machine;
cooling the outsole component;
applying a vulcanizing accelerant to the outsole component by dipping the outsole component in a liquid bath comprising about 15% to about 25% by weight of the vulcanizing accelerant for at least 5 seconds, the vulcanizing accelerant comprising a dithiocarbamate compound;
forming a plurality of rubber outsoles from the outsole component by cutting the outsole component into the plurality of rubber outsoles;
incorporating each of the plurality of rubber outsoles into the footwear article, the footwear article comprising the rubber outsole, an insole and an upper; and vulcanizing the footwear article at a temperature of approximately 120 degrees Celsius for a time of approximately 40 minutes.

Aspect 2: The method according to Aspect 1, wherein the activator comprises zinc oxide.

Aspect 3: The method according to Aspect 1 or 2, wherein the step of vulcanizing the footwear article is performed in an autoclave oven.

Aspect 4: The method according to any of Aspects 1 to 3, wherein the vulcanizing accelerant has an average particle size of less than about 1.5 micrometers.

Aspect 5: The method according to any of Aspects 1 to 4, wherein substantially all of the vulcanizing accelerant has a particle size less than 20 micrometers.

Aspect 6: The method according to any of Aspects 1 to 5, wherein the footwear article further comprises foxing tape.

Aspect 7: A footwear article formed according to a process comprising the steps of:
forming a sheet comprising a rubber outsole material;
forming an outsole component by passing the sheet through an extruder or calendar machine;
applying a vulcanizing accelerant to the outsole component by dipping the outsole component in a liquid bath, the vulcanizing accelerant comprising a dithiocarbamate compound;
forming a plurality of rubber outsoles from the outsole component by cutting the outsole component into the plurality of rubber outsoles;
incorporating each of the plurality of rubber outsoles into the footwear article, the footwear article comprising the rubber outsole, an insole and an upper; and
vulcanizing the footwear article, wherein the step of vulcanizing the footwear article is performed for an amount of time that is from about 30% to about 60% less than an amount of time required to vulcanize a substantially identical footwear article prepared by a substantially identical process but that does not include the step of applying the vulcanizing accelerant to the outsole component.

Aspect 8: The footwear article formed according to the process of Aspect 7, wherein the step of vulcanizing the footwear article is performed for an amount of time that is from about 50% to about 60% less than an amount of time required to vulcanize a substantially identical footwear article prepared by a substantially identical process but that does not include the step of applying the vulcanizing accelerant to the outsole component.

Aspect 9: The footwear article formed according to the process of Aspect 7 or 8, wherein the step of vulcanizing the footwear article is performed at a temperature of approximately 120 degrees Celsius for a time of approximately 40 minutes.

Aspect 10: The footwear article formed according to the process of any of Aspects 7 to 9, wherein the step of vulcanizing the footwear article is performed in an autoclave oven.

Aspect 11: The footwear article formed according to the process of any of Aspects 7 to 10, wherein the liquid bath comprises about 15% to about 25% by weight of the vulcanizing accelerant.

Aspect 12: The footwear article formed according to the process of any of Aspects 7 to 11, wherein the step of applying the vulcanizing accelerant to the outsole component comprises dipping the outsole component in the liquid bath comprising the vulcanizing accelerant for at least 5 seconds.

Aspect 13: The footwear article formed according to the process of any of Aspects 7 to 12, wherein the vulcanizing accelerant has an average particle size of less than about 1.5 micrometers.

Aspect 14: The footwear article formed according to the process of any of Aspects 7 to 13, wherein substantially all of the vulcanizing accelerant has a particle size less than 20 micrometers.

Aspect 15: The footwear article formed according to the process of any of Aspects 7 to 14, wherein the sheet comprising the rubber outsole material comprises one or more natural or synthetic rubber materials, a filler material, a wax material, and an activator.

Aspect 16: The footwear article formed according to the process of Aspect 15, wherein the activator comprises zinc oxide.

Aspect 17: The footwear article formed according to the process of any of Aspects 7 to 16, wherein the footwear article further comprises foxing tape.

Aspect 18: The footwear article formed according to the process of any of Aspects 7 to 17, wherein the step of forming the sheet comprising the rubber outsole material comprises the steps of:
forming a mixture of the rubber outsole material comprising one or more natural or synthetic rubber materials, a filler material, a wax material, and an activator;
compounding the mixture of the rubber outsole material into the sheet; and cooling the sheet.

Aspect 19: A method for making a footwear article, comprising:
forming a sheet comprising a rubber outsole material;
forming an outsole component by passing the sheet through an extruder or calendar machine;
applying a vulcanizing accelerant to the outsole component by dipping the outsole component in a liquid bath, the vulcanizing accelerant comprising a dithiocarbamate compound;
forming a plurality of rubber outsoles from the outsole component by cutting the outsole component into the plurality of rubber outsoles;
incorporating each of the plurality of rubber outsoles into the footwear article, the footwear article comprising the rubber outsole, an insole and an upper; and vulcanizing the footwear article, wherein the step of vulcanizing the footwear article is performed for an amount of time that is from about 30% to about 60% less than an amount of time required to vulcanize a substantially identical footwear article prepared by a substantially identical method but that does not include the step of applying the vulcanizing accelerant to the outsole component.

Aspect 20: The method according to Aspect 19, wherein the step of vulcanizing the footwear article is performed for an amount of time that is from about 50% to about 60% less than an amount of time required to vulcanize a substantially identical footwear article prepared by a substantially identical method but that does not include the step of applying the vulcanizing accelerant to the outsole component.

Aspect 21: The method according to Aspect 19 or 20, wherein the step of vulcanizing the footwear article is performed at a temperature of approximately 120 degrees Celsius for a time of approximately 40 minutes.

Aspect 22: The method according to any of Aspects 19 to 21, wherein the step of vulcanizing the footwear article is performed in an autoclave oven.

Aspect 23: The method according to any of Aspects 19 to 22, wherein the liquid bath comprises about 15% to about 25% by weight of the vulcanizing accelerant.

Aspect 24: The method according to any of Aspects 19 to 23, wherein the step of applying the vulcanizing accelerant to the outsole component comprises dipping the outsole component in the liquid bath comprising the vulcanizing accelerant for at least 5 seconds.

Aspect 25: The method according to any of Aspects 19 to 24, wherein the vulcanizing accelerant has an average particle size of less than about 1.5 micrometers.

Aspect 26: The method according to any of Aspects 19 to 25, wherein substantially all of the vulcanizing accelerant has a particle size less than 20 micrometers.

Aspect 27: The method according to any of Aspects 19 to 26, wherein the sheet comprising the rubber outsole material comprises one or more natural or synthetic rubber materials, a filler material, a wax material, and an activator.

Aspect 28: The method according to Aspect 27, wherein the activator comprises zinc oxide.

Aspect 29: The method according to any of Aspects 19 to 28, wherein the step of forming the sheet comprising the rubber outsole material comprises the steps of:
forming a mixture of the rubber outsole material comprising one or more natural or synthetic rubber materials, a filler material, a wax material, and an activator;
compounding the mixture of the rubber outsole material into the sheet; and cooling the sheet.

Aspect 30: The method according to any of Aspects 19 to 29, wherein the footwear article further comprises foxing tape.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

That which is claimed is:

1. A method for making a footwear article, comprising:
   forming a mixture of rubber outsole material comprising one or more natural or synthetic rubber materials, a filler material, a wax material, and an activator;
   compounding the mixture of rubber outsole material into a sheet;
   cooling the sheet;
   forming an outsole component by passing the sheet through an extruder or calendar machine;
   cooling the outsole component;
   applying a vulcanizing accelerant to the outsole component by dipping the outsole component in a liquid bath comprising about 15% to about 25% by weight of the vulcanizing accelerant for at least 5 seconds, the vulcanizing accelerant comprising a dithiocarbamate compound;
   forming a plurality of rubber outsoles from the outsole component by cutting the outsole component into the plurality of rubber outsoles;
   incorporating each of the plurality of rubber outsoles into the footwear article, the footwear article comprising the rubber outsole, an insole and an upper; and
   vulcanizing the footwear article at a temperature of approximately 120 degrees Celsius for a time of approximately 40 minutes.

2. The method according to claim 1, wherein the activator comprises zinc oxide.

3. The method according to claim 1, wherein the step of vulcanizing the footwear article is performed in an autoclave oven.

4. The method according to claim 1, wherein the vulcanizing accelerant has an average particle size of less than about 1.5 micrometers.

5. The method according to claim 1, wherein substantially all of the vulcanizing accelerant has a particle size less than 20 micrometers.

6. The method according to claim 1, wherein the footwear article further comprises foxing tape.

7. A method for making a footwear article, comprising:
   forming a sheet comprising a rubber outsole material;
   forming an outsole component by passing the sheet through an extruder or calendar machine;
   applying a vulcanizing accelerant to the outsole component by dipping the outsole component in a liquid bath, the vulcanizing accelerant comprising a dithiocarbamate compound;
   forming a plurality of rubber outsoles from the outsole component by cutting the outsole component into the plurality of rubber outsoles;
   incorporating each of the plurality of rubber outsoles into the footwear article, the footwear article comprising the rubber outsole, an insole and an upper; and
   vulcanizing the footwear article.

8. The method according to claim 7, wherein the step of vulcanizing the footwear article is performed at a temperature of approximately 120 degrees Celsius for a time of approximately 40 minutes.

9. The method according to claim 7, wherein the liquid bath comprises about 15% to about 25% by weight of the vulcanizing accelerant.

10. The method according to claim 7, wherein the step of applying the vulcanizing accelerant to the outsole component comprises dipping the outsole component in the liquid bath comprising the vulcanizing accelerant for at least 5 seconds.

11. The method according to claim 7, wherein the sheet comprising the rubber outsole material comprises one or more natural or synthetic rubber materials, a filler material, a wax material, and an activator.

12. The method according to claim 11, wherein the activator comprises zinc oxide.

* * * * *